United States Patent
Petri et al.

(10) Patent No.: US 9,705,730 B1
(45) Date of Patent: Jul. 11, 2017

(54) CLOUD STORAGE USING MERKLE TREES

(71) Applicants: Robert Petri, Santa Clara, CA (US); Nitin Parab, Palo Alto, CA (US)

(72) Inventors: Robert Petri, Santa Clara, CA (US); Nitin Parab, Palo Alto, CA (US)

(73) Assignee: Axcient, Inc., Mountain View, CA (US)

( * ) Notice: Subject to any disclaimer, the term of this patent is extended or adjusted under 35 U.S.C. 154(b) by 551 days.

(21) Appl. No.: 13/889,164

(22) Filed: May 7, 2013

(51) Int. Cl.
*G06F 15/16* (2006.01)
*H04L 29/08* (2006.01)

(52) U.S. Cl.
CPC ................................ *H04L 29/0854* (2013.01)

(58) Field of Classification Search
CPC ........................... H04L 67/2842; G06F 3/0608
See application file for complete search history.

(56) References Cited

U.S. PATENT DOCUMENTS

| | | |
|---|---|---|
| 5,379,412 A | 1/1995 | Eastridge et al. |
| 5,574,905 A | 11/1996 | deCarmo |
| 5,860,107 A | 1/1999 | Patel |
| 6,122,629 A | 9/2000 | Walker et al. |
| 6,205,527 B1 | 3/2001 | Goshey et al. |
| 6,233,589 B1 | 5/2001 | Balcha et al. |
| 6,272,492 B1 | 8/2001 | Kay |
| 6,411,985 B1 | 6/2002 | Fujita et al. |
| 6,604,236 B1 | 8/2003 | Draper et al. |
| 6,629,110 B2 | 9/2003 | Cane et al. |
| 6,651,075 B1 | 11/2003 | Kusters et al. |
| 6,971,018 B1 | 11/2005 | Witt et al. |
| 7,024,581 B1 | 4/2006 | Wang et al. |
| 7,085,904 B2 | 8/2006 | Mizuno et al. |
| 7,266,655 B1 | 9/2007 | Escabi, II et al. |
| 7,401,192 B2 | 7/2008 | Stakutis et al. |
| 7,406,488 B2 | 7/2008 | Stager et al. |
| 7,546,323 B1 | 6/2009 | Timmins et al. |
| 7,620,765 B1 | 11/2009 | Ohr et al. |
| 7,631,155 B1 | 12/2009 | Bono et al. |
| 7,647,338 B2 | 1/2010 | Lazier et al. |
| 7,676,763 B2 | 3/2010 | Rummel |
| 7,730,425 B2 | 6/2010 | de los Reyes et al. |
| 7,743,038 B1 | 6/2010 | Goldick |
| 7,752,487 B1 | 7/2010 | Feeser et al. |
| 7,769,731 B2 | 8/2010 | O'Brien |
| 7,797,582 B1 | 9/2010 | Stager et al. |
| 7,809,688 B2 | 10/2010 | Cisler et al. |

(Continued)

OTHER PUBLICATIONS

Caputo, "Systems and Methods for Restoring a File", U.S. Appl. No. 12/895,275, filed Sep. 30, 2010.
Li et al., "Efficient File Replication," U.S. Appl. No. 13/671,498, filed Nov. 7, 2012.

(Continued)

*Primary Examiner* — Umar Cheema
*Assistant Examiner* — Tesfu Mekonen
(74) *Attorney, Agent, or Firm* — Carr & Ferrell LLP

(57) ABSTRACT

Efficient cloud storage systems, methods, and media are provided herein. Exemplary methods may include locating a Merkle tree of a stored object on a deduplicating block store, comparing an object at a source location to the Merkle tree of the stored object, determining changed blocks for the object at a source location, and transmitting a message across a network to the deduplicating block store, the message including the change blocks and Merkle nodes that correspond to the change blocks.

18 Claims, 5 Drawing Sheets

(56) References Cited

U.S. PATENT DOCUMENTS

| | | |
|---|---|---|
| 7,832,008 B1 | 11/2010 | Kraemer |
| 7,844,850 B2 | 11/2010 | Yasuzato |
| 7,873,601 B1 | 1/2011 | Kushwah |
| 7,930,275 B2 | 4/2011 | Chen et al. |
| 7,966,293 B1 | 6/2011 | Owara et al. |
| 8,037,345 B1 | 10/2011 | Iyer et al. |
| 8,046,632 B2 | 10/2011 | Miwa et al. |
| 8,060,476 B1 | 11/2011 | Afonso et al. |
| 8,099,391 B1 | 1/2012 | Monckton |
| 8,099,572 B1 | 1/2012 | Arora et al. |
| 8,117,163 B2 | 2/2012 | Brown et al. |
| 8,200,926 B1 * | 6/2012 | Stringham ............... 711/162 |
| 8,224,935 B1 * | 7/2012 | Bandopadhyay et al. .... 709/221 |
| 8,244,914 B1 | 8/2012 | Nagarkar |
| 8,245,156 B2 | 8/2012 | Mouilleseaux et al. |
| 8,260,742 B2 * | 9/2012 | Cognigni et al. ............ 707/620 |
| 8,279,174 B2 | 10/2012 | Jee et al. |
| 8,296,410 B1 | 10/2012 | Myhill et al. |
| 8,321,688 B2 | 11/2012 | Auradkar et al. |
| 8,332,442 B1 | 12/2012 | Greene |
| 8,352,717 B2 | 1/2013 | Campbell et al. |
| 8,381,133 B2 | 2/2013 | Iwema et al. |
| 8,402,087 B2 * | 3/2013 | O'Shea et al. ............... 709/203 |
| 8,407,190 B2 | 3/2013 | Prahlad et al. |
| 8,412,680 B1 | 4/2013 | Gokhale et al. |
| 8,417,674 B2 * | 4/2013 | Provenzano ...... G06F 17/30156 |
| | | 707/692 |
| 8,504,785 B1 | 8/2013 | Clifford et al. |
| 8,549,432 B2 | 10/2013 | Warner |
| 8,572,337 B1 | 10/2013 | Gokhale et al. |
| 8,589,350 B1 | 11/2013 | Lalonde et al. |
| 8,589,913 B2 | 11/2013 | Jelvis et al. |
| 8,600,947 B1 | 12/2013 | Freiheit et al. |
| 8,601,389 B2 | 12/2013 | Schulz et al. |
| 8,606,752 B1 | 12/2013 | Beatty et al. |
| 8,639,917 B1 | 1/2014 | Ben-Shaul et al. |
| 8,676,273 B1 | 3/2014 | Fujisaki |
| 8,745,003 B1 | 6/2014 | Patterson |
| 8,886,611 B2 | 11/2014 | Caputo |
| 8,924,360 B1 | 12/2014 | Caputo |
| 8,954,544 B2 | 2/2015 | Edwards |
| 9,104,621 B1 | 8/2015 | Caputo |
| 9,110,964 B1 * | 8/2015 | Shilane .................. G06F 11/14 |
| 9,213,607 B2 | 12/2015 | Lalonde et al. |
| 9,235,474 B1 | 1/2016 | Petri et al. |
| 9,292,153 B1 | 3/2016 | Edwards et al. |
| 9,397,907 B1 | 7/2016 | Edwards et al. |
| 9,559,903 B2 | 1/2017 | Edwards |
| 2001/0034737 A1 | 10/2001 | Cane et al. |
| 2001/0056503 A1 | 12/2001 | Hibbard |
| 2002/0169740 A1 | 11/2002 | Korn |
| 2003/0011638 A1 | 1/2003 | Chung |
| 2003/0158873 A1 | 8/2003 | Sawdon et al. |
| 2003/0177293 A1 | 9/2003 | Bilak et al. |
| 2003/0208492 A1 | 11/2003 | Winiger et al. |
| 2004/0030852 A1 | 2/2004 | Coombs et al. |
| 2004/0044707 A1 | 3/2004 | Richard |
| 2004/0073560 A1 | 4/2004 | Edwards |
| 2004/0073677 A1 | 4/2004 | Honma et al. |
| 2004/0093474 A1 | 5/2004 | Lin et al. |
| 2004/0098423 A1 | 5/2004 | Chigusa et al. |
| 2004/0233924 A1 | 11/2004 | Bilak et al. |
| 2004/0260973 A1 | 12/2004 | Michelman |
| 2005/0010835 A1 | 1/2005 | Childs et al. |
| 2005/0027748 A1 | 2/2005 | Kisley |
| 2005/0114290 A1 | 5/2005 | Borthakur et al. |
| 2005/0154937 A1 | 7/2005 | Achiwa |
| 2005/0171979 A1 | 8/2005 | Stager et al. |
| 2005/0223043 A1 | 10/2005 | Randal et al. |
| 2005/0273654 A1 | 12/2005 | Chen et al. |
| 2005/0278583 A1 | 12/2005 | Lennert et al. |
| 2005/0278647 A1 | 12/2005 | Leavitt et al. |
| 2006/0013462 A1 | 1/2006 | Sadikali |
| 2006/0047720 A1 | 3/2006 | Kulkarni et al. |
| 2006/0064416 A1 | 3/2006 | Sim-Tang |
| 2006/0224636 A1 | 10/2006 | Kathuria et al. |
| 2007/0033301 A1 | 2/2007 | Aloni et al. |
| 2007/0038884 A1 | 2/2007 | Campbell et al. |
| 2007/0061385 A1 | 3/2007 | Clark et al. |
| 2007/0112895 A1 | 5/2007 | Ahrens et al. |
| 2007/0113032 A1 | 5/2007 | Kameyama et al. |
| 2007/0176898 A1 | 8/2007 | Suh |
| 2007/0180207 A1 | 8/2007 | Garfinkle |
| 2007/0198789 A1 | 8/2007 | Clark et al. |
| 2007/0204166 A1 | 8/2007 | Tome et al. |
| 2007/0208918 A1 | 9/2007 | Harbin et al. |
| 2007/0220029 A1 | 9/2007 | Jones et al. |
| 2007/0226400 A1 | 9/2007 | Tsukazaki |
| 2007/0233699 A1 | 10/2007 | Taniguchi et al. |
| 2007/0250302 A1 | 10/2007 | Xu et al. |
| 2007/0260842 A1 | 11/2007 | Faibish et al. |
| 2007/0276916 A1 | 11/2007 | McLoughlin et al. |
| 2007/0283017 A1 | 12/2007 | Anand et al. |
| 2007/0283343 A1 | 12/2007 | Aridor et al. |
| 2007/0288525 A1 | 12/2007 | Stakutis et al. |
| 2007/0288533 A1 | 12/2007 | Srivastava et al. |
| 2007/0294321 A1 | 12/2007 | Midgley et al. |
| 2008/0005468 A1 | 1/2008 | Faibish et al. |
| 2008/0010422 A1 | 1/2008 | Suzuki et al. |
| 2008/0027998 A1 | 1/2008 | Hara |
| 2008/0036743 A1 | 2/2008 | Westerman et al. |
| 2008/0082310 A1 | 4/2008 | Sandorfi et al. |
| 2008/0133622 A1 | 6/2008 | Brown et al. |
| 2008/0141018 A1 | 6/2008 | Tanaka et al. |
| 2008/0154979 A1 | 6/2008 | Saitoh et al. |
| 2008/0162590 A1 | 7/2008 | Kundu et al. |
| 2008/0162607 A1 | 7/2008 | Torii et al. |
| 2008/0201315 A1 | 8/2008 | Lazier et al. |
| 2008/0229050 A1 | 9/2008 | Tillgren |
| 2008/0307345 A1 | 12/2008 | Hart et al. |
| 2008/0307527 A1 | 12/2008 | Kaczmarski et al. |
| 2009/0089253 A1 | 4/2009 | Huang et al. |
| 2009/0094427 A1 | 4/2009 | Sano |
| 2009/0164527 A1 | 6/2009 | Spektor et al. |
| 2009/0185500 A1 | 7/2009 | Mower et al. |
| 2009/0216973 A1 | 8/2009 | Nakajima et al. |
| 2009/0248755 A1 | 10/2009 | Watanabe et al. |
| 2009/0309849 A1 | 12/2009 | Iwema et al. |
| 2009/0319653 A1 | 12/2009 | Lorenz et al. |
| 2009/0327964 A1 | 12/2009 | Mouilleseaux et al. |
| 2010/0077165 A1 | 3/2010 | Lu et al. |
| 2010/0095077 A1 | 4/2010 | Lockwood |
| 2010/0104105 A1 | 4/2010 | Schmidt et al. |
| 2010/0107155 A1 | 4/2010 | Banerjee et al. |
| 2010/0114832 A1 * | 5/2010 | Lillibridge et al. .......... 707/649 |
| 2010/0165947 A1 | 7/2010 | Taniuchi et al. |
| 2010/0179973 A1 | 7/2010 | Carruzzo |
| 2010/0192103 A1 | 7/2010 | Cragun et al. |
| 2010/0205152 A1 | 8/2010 | Ansari et al. |
| 2010/0228999 A1 | 9/2010 | Maheshwari et al. |
| 2010/0235831 A1 | 9/2010 | Dittmer |
| 2010/0262637 A1 | 10/2010 | Akagawa et al. |
| 2010/0268689 A1 | 10/2010 | Gates et al. |
| 2010/0318748 A1 | 12/2010 | Ko et al. |
| 2010/0325377 A1 | 12/2010 | Lango et al. |
| 2010/0332454 A1 | 12/2010 | Prahlad et al. |
| 2011/0041004 A1 | 2/2011 | Miwa et al. |
| 2011/0047405 A1 | 2/2011 | Marowsky-Bree et al. |
| 2011/0055399 A1 | 3/2011 | Tung et al. |
| 2011/0055471 A1 * | 3/2011 | Thatcher et al. ............. 711/114 |
| 2011/0055500 A1 | 3/2011 | Sasson et al. |
| 2011/0082998 A1 | 4/2011 | Boldy et al. |
| 2011/0106768 A1 | 5/2011 | Khanzode et al. |
| 2011/0154268 A1 | 6/2011 | Trent, Jr. et al. |
| 2011/0218966 A1 | 9/2011 | Barnes et al. |
| 2011/0238937 A1 | 9/2011 | Murotani et al. |
| 2011/0264785 A1 | 10/2011 | Newman et al. |
| 2011/0265143 A1 * | 10/2011 | Grube et al. ..................... 726/2 |
| 2011/0295811 A1 | 12/2011 | Cherkasova et al. |
| 2011/0302502 A1 | 12/2011 | Hart et al. |
| 2012/0013540 A1 | 1/2012 | Hogan |
| 2012/0065802 A1 | 3/2012 | Seeber et al. |

(56) References Cited

U.S. PATENT DOCUMENTS

| | | |
|---|---|---|
| 2012/0084501 A1 | 4/2012 | Watanabe et al. |
| 2012/0124307 A1 | 5/2012 | Ashutosh et al. |
| 2012/0130956 A1 | 5/2012 | Caputo |
| 2012/0131235 A1 | 5/2012 | Nageshappa et al. |
| 2012/0179655 A1 | 7/2012 | Beatty et al. |
| 2012/0204060 A1 | 8/2012 | Swift et al. |
| 2012/0210398 A1 | 8/2012 | Triantafillos et al. |
| 2012/0215743 A1 | 8/2012 | Triantafillos et al. |
| 2013/0018946 A1 | 1/2013 | Brown et al. |
| 2013/0024426 A1 | 1/2013 | Flowers et al. |
| 2013/0036095 A1 | 2/2013 | Titchener et al. |
| 2013/0091183 A1 | 4/2013 | Edwards et al. |
| 2013/0091471 A1 | 4/2013 | Gutt et al. |
| 2013/0166511 A1 | 6/2013 | Ghatty et al. |
| 2013/0238562 A1 | 9/2013 | Kumarasamy et al. |
| 2013/0238752 A1* | 9/2013 | Park ............... H04L 67/1097 709/217 |
| 2013/0318046 A1 | 11/2013 | Clifford et al. |
| 2014/0006858 A1* | 1/2014 | Helfman et al. ............ 714/19 |
| 2014/0032498 A1 | 1/2014 | Lalonde et al. |
| 2014/0047081 A1 | 2/2014 | Edwards |
| 2014/0052694 A1 | 2/2014 | Dasari et al. |
| 2014/0053022 A1 | 2/2014 | Forgette et al. |
| 2014/0089619 A1* | 3/2014 | Khanna et al. ............ 711/166 |
| 2014/0101113 A1 | 4/2014 | Zhang et al. |
| 2014/0149358 A1 | 5/2014 | Aphale et al. |
| 2014/0189680 A1 | 7/2014 | Kripalani |
| 2014/0201137 A1 | 7/2014 | Vibhor et al. |
| 2014/0244599 A1 | 8/2014 | Zhang et al. |
| 2014/0303961 A1 | 10/2014 | Leydon et al. |
| 2015/0046404 A1 | 2/2015 | Caputo |
| 2015/0095691 A1 | 4/2015 | Edwards |
| 2016/0054911 A1 | 2/2016 | Edwards et al. |
| 2016/0055062 A1 | 2/2016 | Petri et al. |
| 2016/0105312 A1 | 4/2016 | Edwards |
| 2016/0110261 A1 | 4/2016 | Parab et al. |
| 2016/0162349 A1 | 6/2016 | Edwards et al. |
| 2017/0075719 A1 | 3/2017 | Scallan et al. |
| 2017/0090786 A1 | 3/2017 | Parab et al. |

OTHER PUBLICATIONS

Non-Final Office Action, Jun. 1, 2016, U.S. Appl. No. 15/019,951, filed Feb. 9, 2016.
Advisory Action, Jun. 8, 2016, U.S. Appl. No. 14/564,082, filed Dec. 8, 2014.
Non-Final Office Action, Oct. 5, 2016, U.S. Appl. No. 14/970,480, filed Dec. 15, 2015.
Notice of Allowance, Oct. 18, 2016, U.S. Appl. No. 14/564,082, filed Dec. 8, 2014.
Final Office Action, Oct. 27, 2016, U.S. Appl. No. 14/977,581, filed Dec. 21, 2015.
Non-Final Office Action, Jun. 28, 2016, U.S. Appl. No. 13/671,498, filed Nov. 7, 2012.
Non-Final Office Action, Aug. 10, 2016, U.S. Appl. No. 14/522,527, filed Oct. 23, 2014.
Non-Final Office Action, Aug. 23, 2016, U.S. Appl. No. 13/633,695, filed Oct. 2, 2012.
Corrected Notice of Allowability, Dec. 5, 2016, U.S. Appl. No. 14/564,082, filed Dec. 8, 2014.
Non-Final Office Action, Dec. 9, 2016, U.S. Appl. No. 15/019,951, filed Feb. 9, 2016.
Final Office Action, Dec. 27, 2016, U.S. Appl. No. 13/671,498, filed Nov. 7, 2012.
Advisory Action, Feb. 7, 2017, U.S. Appl. No. 14/977,581, filed Dec. 21, 2015.
Final Office Action, Feb. 9, 2017, U.S. Appl. No. 14/522,527, filed Oct. 23, 2014.
Advisory Action, Feb. 13, 2017, U.S. Appl. No. 15/019,951, filed Feb. 9, 2016.
Final Office Action, Mar. 6, 2017, U.S. Appl. No. 13/633,695, filed Oct. 2, 2012.
Non-Final Office Action, Mar. 22, 2017, U.S. Appl. No. 14/864,850, filed Sep. 24, 2015.
Advisory Action, Mar. 30, 2017, U.S. Appl. No. 14/977,581, filed Dec. 21, 2015.
Advisory Action, Apr. 20, 2017, U.S. Appl. No. 13/671,498, filed Nov. 7, 2012.
Advisory Action, Apr. 25, 2017, U.S. Appl. No. 14/522,527, filed Oct. 23, 2014.

* cited by examiner

```
for each merkle node in args
        for each child pointer (ie., hash)
                if child hash does not exists
                  add child hash in response hashes list.
        if the node had any child hash missing push the node on stack.
if no nodes added to stack return "complete"
else return incomplete with response hash list.
```

FIG. 2

```
while (stack is not empty)
    node = pop top of stack;
    synchronous put of node;
```

FIG. 3

```
current level = root;
current merkle nodes = root merkle node
while (level is not leaf)
        response = BULK_PUSH(current merkle nodes) to destination block store;
        if response == all nodes exist then break;
        increment current level;
        current merkle nodes = add all nodes from response;
if (level is leaf)
    data node list = get data blocks for all hashes in response list;
    BULK_PUT (data node list);
POP stack.
```

FIG. 4

CLOUD STORAGE USING MERKLE TREES

FIELD OF THE INVENTION

The present technology may be generally described as providing systems and methods for transmitting backup objects over a network, and specifically efficiently transmitting large backup objects.

BACKGROUND

Transmitting an object, such as a file, across a network usually requires the transmission of all blocks of data for the object to a block store, i.e., the application program interface (API) provided to write a new data object expect the entire data object to be transmitted. A unique identifier may be assigned to the object when it is stored on the block store. This unique identifier allows for subsequent retrieval of the object from the block store at a later point in time.

SUMMARY OF THE PRESENT TECHNOLOGY

According to some embodiments, the present technology may be directed to method of transmitting an object over the network to a deduplicating storage system that uses Merkle Tree representations for objects stored therein.

According to some embodiments, the present technology may be directed to methods that comprise: (a) locating a Merkle tree of a stored object on a deduplicating block store; (b) comparing an object at a source location to the Merkle tree of the stored object; (c) determining changed blocks for the object at a source location; and (d) transmitting a message across a network to the deduplicating block store, the message including the change blocks and Merkle nodes that correspond to the change blocks.

According to some embodiments, the present technology may be directed to systems that comprise: (a) a processor; (b) logic encoded in one or more tangible media for execution by the processor and when executed operable to perform operations comprising: (i) locating a Merkle tree of a stored object on a deduplicating block store; (ii) comparing an object at a source location to the Merkle tree of the stored object; (iii) determining changed blocks for the object at a source location; and (iv) transmitting a message across a network to the deduplicating block store, the message including the change blocks and Merkle nodes that correspond to the change blocks.

According to some embodiments, the present technology may be directed to methods that comprise: (a) generating a first Merkle tree for an object, the first Merkle tree comprising Merkle nodes that represent blocks of the object; (b) examining an input data stream; and (c) generating a second Merkle tree for the object using the input data stream; (d) comparing the first Merkle tree and the second Merkle tree to one another to determine changed Merkle nodes that do not correspond between the first Merkle tree and the second Merkle tree; and (e) transmitting data blocks that correspond to the changed Merkle nodes from a source location to a deduplicating block store.

According to some embodiments, the present technology may be directed to a non-transitory machine-readable storage medium having embodied thereon a program. In some embodiments the program may be executed by a machine to perform a method that includes: (a) locating a Merkle tree of a stored object on a deduplicating block store; (b) comparing an object at a source location to the Merkle tree of the stored object; (c) determining changed blocks for the object at a source location; and (d) transmitting a message across a network to the deduplicating block store, the message including the change blocks and Merkle nodes that correspond to the change blocks.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 2 illustrates exemplary logic utilized by the present technology to perform PUSH and BULK_PUSH operations;

FIG. 3 illustrates exemplary logic utilized by the present technology to perform POP operations from that remove Merkle nodes (e.g., hashes) from a stack;

FIG. 4 illustrates exemplary logic utilized by the present technology to perform a Merkle tree copy;

DESCRIPTION OF EXEMPLARY EMBODIMENTS

Figure 1:
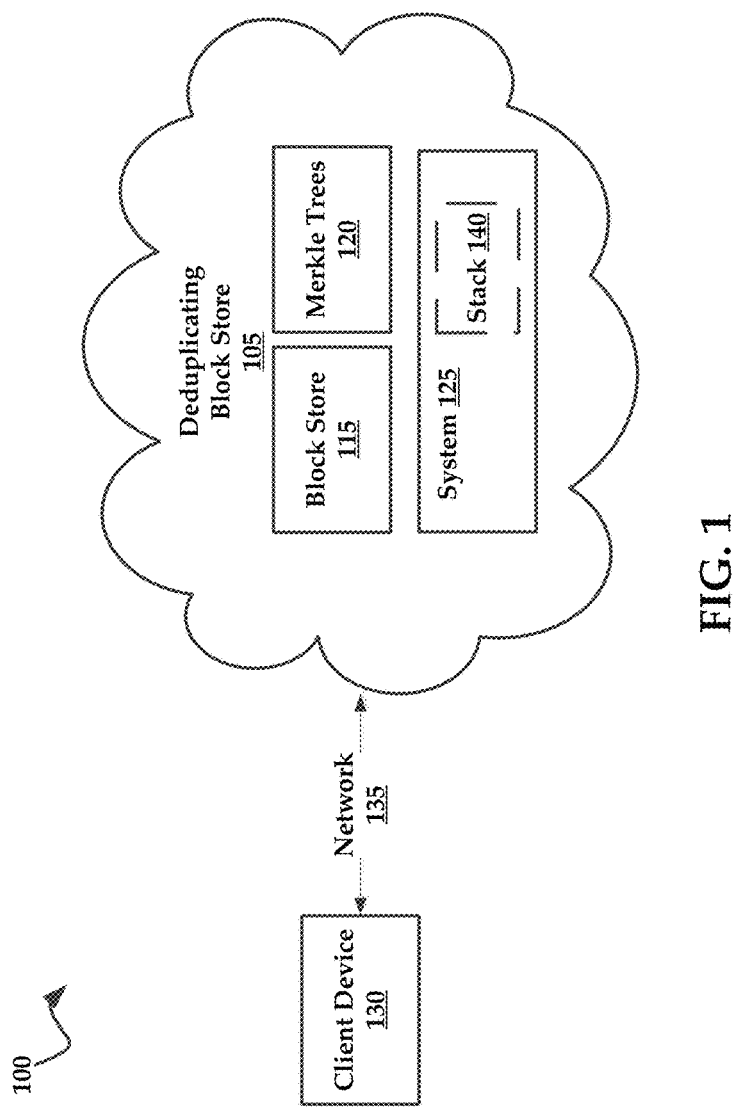
FIG. 1 is a block diagram of an exemplary architecture in which embodiments of the present technology may be practiced.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology may provide end-to-end deduplication of data by exporting the Merkle Tree via an application programming interface ("API") used to store/transfer objects into the storage system. In some instances, deduplication may include the creation of Merkle trees that represent an object. These Merkle trees may be exported as a storage API.

The present technology provides methods of transmitting objects from a source to a destination, where the destination storage system is a deduplicating storage system that uses Merkle Tree representations to describe objects. More specifically, the present technology specifies an API for transferring an object more efficiently by, for example, avoiding transmitting chunks of the object that already exist at the destination storage system. An exemplary API exploits the hierarchical nature of the Merkle Tree to reduce the number of round trip messages required by first determining chunks of the object, which already exists at the destination storage system. The present technology extends a Merkle Tree based deduplicating storage system by performing deduplication of data while transmitting the data to the storage system.

A destination cloud-based block store may internally store data in a deduplicating fashion where unique chunks of objects are stored only once. The API of the destination block store may internally store objects in a deduplicated manner such that only unique chunks of the objects are stored and the object is described using a Merkle Tree. As background, a destination cloud-based block store may be referred to as a De-Duplicating Block Store. In some instances, the deduplicating block store may store unique blocks of data. The block store may provide a simple API to provide the following functionalities: (i) PUT: store a block of data with a uniform hash as the key; (ii) GET: read a block with given the uniform hash; (iii) EXIST: lookup if a block with given that the uniform hash already exists. The block store supports for reference count or garbage collection for reclamation of space by unused blocks. It is noteworthy that this block store itself can be viewed as a key-value store where the key is the uniform hash of the block and the value is the data of the block.

In some instances, Merkle trees may be utilized in conjunction with de-duplicating block stores. In some instances, any given stream of data can be stored into a block store as follows: (i) split the stream on chunks of data, store each chunk of data in the block store with the uniform hash of the block as key and take the uniform hash of an extent (continuous blocks) of the stream store in the block store as a block. The uniform hash of this block now represents the entire extent. Similarly, the uniform hashes of continuous extents may be stored as a block, getting back a new uniform hash that represents part of the stream containing those extents. The Merkle tree is built using the aforementioned steps until is a single uniform hash is generated that represents the entire stream. Thus, the identity of an extent, comprised of one or more data blocks, is the hash of the contents of the deepest branch node in which the entire extent is descended. Such an identity of a whole or branch of a Merkle tree is therefore reproducible given the same extent of data. If the blocks are stored into the blocks store in a bottom to top manner such that no Merkle block is stored before storing all the blocks it refers, such an invariant allows the system to assume that if an EXIST check on Merkel root uniform hash returns true, it can be assumed all its children will also return true for their respective EXIST checks. Representing a data stream using Merkel tree provides support for most normal stream operations like (i) read a stream sequentially or randomly; (ii) update a stream giving a new Merkel root for the stream; (iii) concatenate of streams to give a Merkel root for concatenated stream; and so forth. Note that update of a stream is a copy-on-write operations since it will generate a new uniform hash Merkel root.

With regard to the present technology, the Merkle trees may be utilized in transmitting changed blocks over a network. In some instances, changed blocks of an object may be detected by walking a Merkle tree or a plurality of Merkle trees for an object and determining changed blocks. These changed blocks may be transmitted over the network to a block store as well as corresponding Merkle nodes that represent these changed blocks. Using the changed blocks and Merkle nodes, the changed blocks may be incorporated into the block store. These and other advantages of the present technology will be discussed in greater detail herein.

Generally, the present technology provides for a bandwidth optimized, cloud-based object store. The present technology allows for efficient transfer of object/stream of data from client to the cloud data center in a bandwidth optimized fashion. For example, the present technology reduces the transmission (e.g., transfer) of chunks of data that already exists in the data center. The solution is to deploy above de-duplicating object store both on the client side and in the cloud.

In some instances, methods employing the present technology include a step of storing an object in the client side de-duplicating object store and copying a Merkle tree from the client side block store to a data center side block store. The present technology may determine if the blocks of the stream on the client side already exist in the data center and avoid sending them if the blocks do, in fact, exist. Storing the object in the blockstore using a Merkle tree also provides the additional advantage of checking if a larger extent of the stream containing more than one block already exists in the data center. Again, it can be assumed that if an exist check on Merkle root uniform hash returns true than all its children will also return true for exist checks.

The straight-forward algorithm to copy a Merkle tree from source blockstore to destination blockstore is to start from the uniform hash of the root of the Merkle tree and check if it exists in the destination blockstore. If the uniform hash of the root of the tree exists it can be safely assumed that the entire tree exists. If not, a check should be executed against each of the uniform hashes contained in the root Merkle node to determine if they exist in the destination blockstore. This method continues down the tree recursively following the paths that don't exist until the system reaches leaves that don't exist. Leaves that don't exist may be PUT in the destination blockstore. One may then reconstruct the entire tree in the destination blockstore. Note that a Merkle block cannot be put into the block store before all of its children all the way down to the root data blocks are put into the system (this is the sequentially consistent requirement for Merkle heads). Thus this straight forward algorithm has to first descend to the leaves (note each EXISTS call is a message over the WAN) and then PUT (again call over the WAN) blocks bottom up from leaves up to the root Merkle.

The algorithm walks the tree breadth first and pushes all non-existent nodes at a level onto the stack. At the leaf level all the non-existent data blocks are put into the data store. After that, the stack is popped with each node on the stack put into the datastore. Thus an operation to transfer a new version of an object that differs by a single block will result into 2× (height of the tree) calls over the WAN. A WAN optimized algorithm avoids the second set of PUT calls by building the stack on the data center side and then making a single new API call to PUT all the nodes that are to be transferred, while maintaining the sequentially consistent requirement for Merkle heads. If the stack is built at the destination, then the Merkle blocks can be sent only once during the EXISTS check and pushed into the stack at the same time. The WAN optimized copy of Merkle tree protocol defines PUT, GET, EXISTS messages with equivalent bulk variants, which work only on data blocks. The protocol exports the concept of a "group" allowing for a flush/commit operation/message, which guarantees that all previous PUTS in the group are synced, similarly to a write barrier but limited to the group. For Merkle blocks the protocol defines PUSH and POP messages along with bulk variants. Each Merkle tree copy operation may be performed in the context of a single group.

These and other advantage of the present technology will be described below with reference to the drawings (e.g., FIGS. 1-7).

Referring now to the drawings, and more particularly, to FIG. 1, which includes a schematic diagram of an exemplary architecture 100 for practicing the present invention. Architecture 100 may include a block store 105. In some instances, the block store 105 may be implemented within a cloud-based computing environment. In general, a cloud-based computing environment is a resource that typically combines the computational power of a large model of processors and/or that combines the storage capacity of a large model of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of servers, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

In some instances the block store 105 may include a deduplicating block store 115 that stores blocks of data for one or more objects, such as a file, a group of files, or an entire disk. Additionally the block store 105 may comprise Merkle trees 120 that include hash-type representations of objects within the deduplicating block store 115. That is, for each object (or group of blocks), a Merkle tree exists that represents the blocks of the object.

According to some embodiments, the deduplicating block store 115 may include immutable object addressable block storage. The deduplicating block store 115 may form an underlying storage foundation that allows for the storing of blocks of objects. The identifiers of the blocks are a unique representation of the block, generated for example by using a uniform hash function. The present technology may also use other cryptographic hash functions that would be known to one of ordinary skill in the art with the present disclosure before them.

The architecture 100 may include a deduplication system, hereinafter referred to as system 125 that generates Merkle trees that represent the objects stored in the deduplicating block store 115. Once the Merkle tree for the object has been created, the Merkle tree may be exposed to a client device 130 via an API. The client device 130 may use the API to determine changed blocks for an object and/or transmit the changed blocks to the deduplicating block store 115. In some instances the client device may include an end user computing system, an appliance, such as a backup appliance, a server, or any other computing device that may include objects such as files, directories, disks, and so forth.

In some instances the API may encapsulate messages and their respective operations, allowing for efficient writing of objects over a network, such as network 135. In some instances, the network 135 may comprise a local area network ("LAN"), a wide area network ("WAN"), or any other private or public network, such as the Internet. In some instances the API may utilize various commands such as PUT, GET, and EXIST. The EXIST command allows the system 125 to determine if a block exists in the deduplicating block store 115, as will be described in greater detail below.

According to some embodiments, the API supports two 'methods' of transferring an object using Merkle tree semantics. For example, in some embodiments the API may use a reduced number of messages (round trips) but may require buildup of a stack 140 (which can comprise a state stack) the system 125 side. In other embodiments the API may use relatively more messages (round trips) but the stack 140 may be built on the client device 130. Either of these methods provides improved cloud storage (or within dedicated block stores such as various storage media) of objects due to significant reductions in the amount of data transferred to the deduplicating block store 115.

The system 125 may utilize Merkle tree synchronization to facilitate transmission of blocks to the deduplicating block store 115 via the network 135. In general, the Merkle tree synchronization used by the system 125 may allow for relatively lower latency (e.g., less chatty protocols) and improved pipeline utilization compared to current cloud storage method and systems. Additionally, the system 125 may provide progress indicators that provide information indicative of the transfer of changed blocks over the network 135 to the deduplicating block store 115.

Generally, the system 125 may generate a Merkle tree for an object. The Merkle tree may be passed to the block store 105. The Merkle tree for the object is then exposed to the client device as an API or protocol that can be used to determine changes in an object relative to a backup of the object store in the deduplicating block store 115. In some instances, the backup of the object may include a snapshot of the object.

In accordance with the present disclosure, semantics utilized by the system 125 provide that if an EXIST call on a Merkle block returns 'true', then the whole tree relative to any Merkle block as root (e.g., parent Merkle node) is considered to exist. Thus, a block store associated with a Merkle node cannot be put into the deduplicating block store 115 before all of the blocks associated with children Merkle nodes are placed into the deduplicating block store 115. In other words, the system 125 may rely on sequential consistency of Merkle nodes within a Merkle tree when analyzing any Merkle node head within the Merkle tree. The system 125 may facilitate a Merkle tree copy from one datastore to another, in a bottom-to-top manner so as to not break the above semantic requirements.

In some instances, the algorithm utilized by the system 125 walks the Merkle tree breadth first and pushes all missing (e.g., non-existent) nodes at a given level of the Merkle tree onto the stack 140. Again, the stack 140 may exist on the block store 105 or the client device 130.

At the leaf level, all the missing data blocks may be put into the deduplicating block store 115. Subsequently, the stack 140 can be popped with each node on the stack put into the block store 105. It is noteworthy that even if a stack is built, a sync or copy protocol used by the system 125 should begin at a root node and proceed downwardly though the Merkle tree in a top-to-bottom manner, performing EXIST checks on all Merkle nodes in the Merkle tree. If the system 125 determines Merkle nodes that exist, the system 125 may avoid sending these existing subtrees to the block store 105. The term "existing" should be understood to include nodes that are substantially identical (e.g., not a changed or new node).

If the stack 140 is built at the client device 130 the Merkle nodes may be sent twice. The Merkle nodes may be sent once to allow the system 125 to perform top-to-bottom EXIST checks on each Merkle node within a Merkle tree and once for popping the stack 140 for synchronization with the block store 105.

However, if the stack 140 is built at the block store 105 the Merkle blocks may be sent only once during EXIST checks and pushed into the stack 140 at the same time. According to some embodiments the stack 140 serves another purpose in that it catalogs work to be performed to sync a Merkle Tree from the client device 130 to block store 105. The system 125 may enable a "progress indicator" that represents the stack 140.

According to some embodiments, the protocols used by the system 125 may define PUT, GET, and EXIST messages with equivalent bulk variants which work on data blocks. The protocol may be used to export the concept of a "group," allowing for a flush and/or commit operation (e.g., message) which guarantees that previous PUTS in the group are synced. This functionality is similar to a write barrier but limited to the group. For Merkle blocks the protocol defines PUSH and POP messages along with bulk variants. Each Merkle tree copy operation may be executed in the context of a single group.

FIG. 2 illustrates exemplary logic utilized by the system 125 to perform PUSH and BULK_PUSH operations. This exemplary logic allows the system 125 to evaluate Merkle nodes in a Merkle tree and determine if a child hash (e.g., child Merkle node) does not exist. If a child hash does not exist in the system 125 then the system 125 adds the child hash to a hash list. Additionally, if a Merkle node has a missing child hash, the system 125 may push the Merkle node onto a stack. Once the Merkle tree has been processed, the system 125 may return a response hash list to the client device 130.

FIG. 3 illustrates exemplary logic utilized by the system 125 to perform POP operations that remove Merkle nodes (e.g., hashes) from a stack 140. Working on a last in-first out manner, the system 125 may POP a Merkle node on the top of the stack 140 and put the Merkle node on the stratum block store, synchronously. It will be understood that the system 125 may perform these POP and PUT operations while the stack 140 includes at least one Merkle node therein.

FIG. 4 illustrates exemplary logic utilized by the system 125 to perform a Merkle tree copy. In general, the system 125 may look at a root Merkle node in a Merkle tree and process the remaining Merkle nodes in a bottom-to-top manner. The system 125 may BULK-PUSH current Merkle nodes to the stratum block store in some instances. If the system 125 determines that all Merkle nodes exist, then the system 125 ignores these Merkle nodes. That is, the system 125 deduplicates the blocks of data using the Merkle tree. Only when Merkle nodes are non-existent are the blocks of data that correspond to the Merkle nodes (and potentially the child nodes of a Merkle node) transmitted over the network to the deduplicating block store 115.

Thus, when a non-existent Merkle node is detected, the system 125 may gather block(s) for the Merkle node (or all blocks for child Merkle nodes associated with the non-existent Merkle node) and POP the stack 140.

According to some embodiments, a stratum may be used as the base of the data storage architecture utilized herein. The stratum may consist of a block store, such as deduplicating block store 115 and corresponding Merkle trees. The deduplicating block store 115 may be a content-unaware layer responsible for storing, ref-counting, and/or deduplication. The Merkle Tree data structures described herein may, using the deduplicating block store 115, encapsulate object data as a collection of blocks optimized for both differential and offsite tasks. The block store 105 provides support for transferring a Merkle tree (with all its data blocks) between the client device 130 and the block store 105. A block store on the client device may proactively send data blocks to the block store in order to provide low latency when the system 125 tries to send a block from the client device to the block store.

The stratum block store provides unstructured block storage and may include the following features. The block store may be adapted to store a new block and encrypt the block as needed using context and/or identifiers. The block store may also deduplicate blocks, storing each unique block only once. The block store may also maintain a ref-count or equivalent mechanism to allow rapid reclamation of unused blocks, as well as being configured to retrieve a previously stored block and/or determine if a block exists in the block store given a particular hash (e.g., Merkle node).

Various applications may store Merkle tree identifiers (e.g., root hashes) within a Merkle tree, thus creating a hierarchy building from individual file Merkles to restore point Merkles, representing an atomic backup set.

Figure 5:
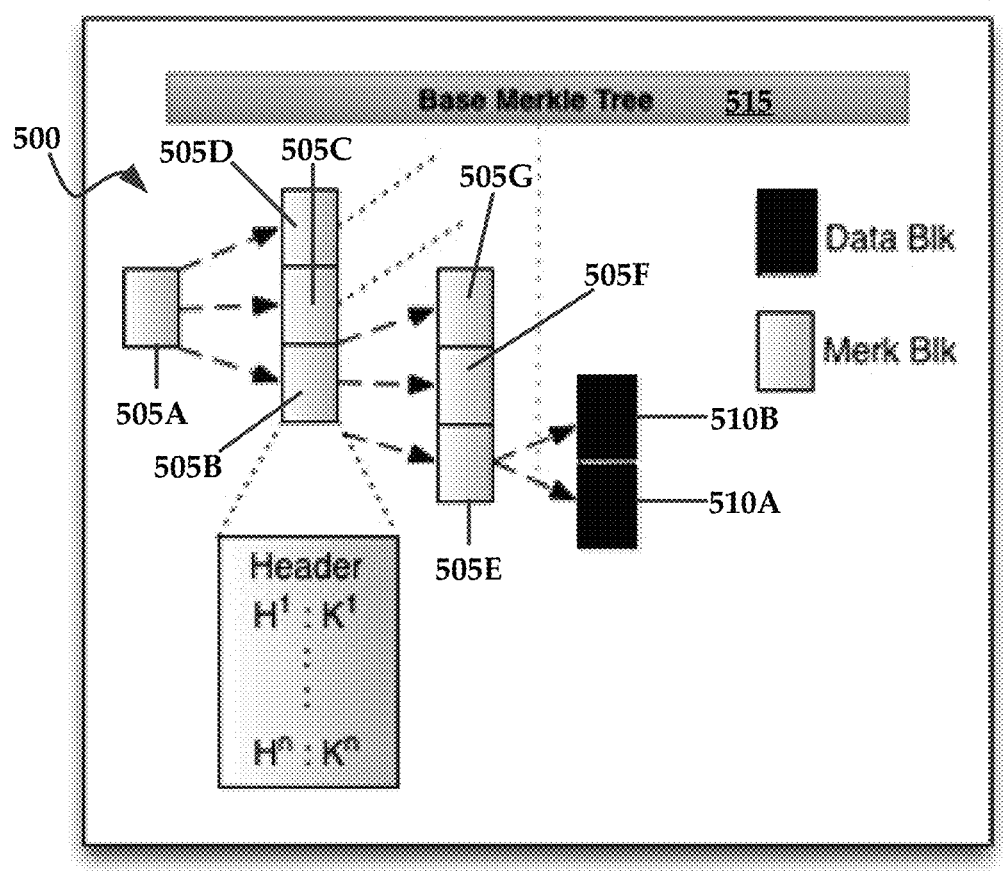
FIG. 5 illustrates the use of an exemplary stratum Merkle tree.

FIG. 5 illustrates the use of a second Merkle tree 500 that includes various Merkle nodes 505A-G, where 505A is a root Merkle node, 505B-D are child Merkle nodes of the root Merkle node 505A, and child Merkle nodes 505E-G are child Merkle nodes of the Merkle node 505B. Assuming that child Merkle node 505E is a non-existent node, the system may obtain data blocks 510A and 510B from a base Merkle tree. Again, the base Merkle tree was an initial Merkle tree generated for an object that is stored in a block store.

Again, the use of Merkle trees allows for efficient identification of differences or similarities between multiple Merkle trees (whole or partial). These multiple Merkle trees correspond to Merkle trees generated for an object at different points in time.

The identity property of any Merkle node relative to its child nodes provides an efficient method for identification of blocks which do not already exist on a remote system, such as a cloud block store. The Stratum Merkle functions utilized by the system 125 may export various interfaces to the client device. For example, the system 125 may allow for stream-based write operations where a new Merkle tree is constructed based on an input data stream. In other instances, the system may allow for stream-based read operations where data blocks described by the Merkle are presented sequentially.

In other instances, the system 125 may allow for random-based read operations of block in the block store by using arbitrary offset and size reads. Additionally, the system 125 may generate comparisons that include differences between two or more Merkle trees for an object.

The system 125 may allow for stream-based copy-on-write operations. For example, given an input data stream of offset and extent data and a predecessor Merkle tree, a new Merkle tree may be constructed by the system 125, which is equivalent to the predecessor modified by the change blocks in the input data stream.

In some instances the stratum Merkle tree uses a stratum block store to store its blocks, both data blocks and Merkle blocks (e.g. Merkle nodes). The blocks may be stored into the blocks store from the bottom up so that no Merkle block is stored before storing all the blocks to which it refers. This feature allows the Merkle tree layer and other layers using stratum block store to safely assume that if an EXIST check on a particular Merkle block returns true, all its children nodes will also return true for their EXIST checks. Thus, EXIST checks need not be performed on these child nodes, although in some instances, EXIST checks may nevertheless be performed.

Figure 6:
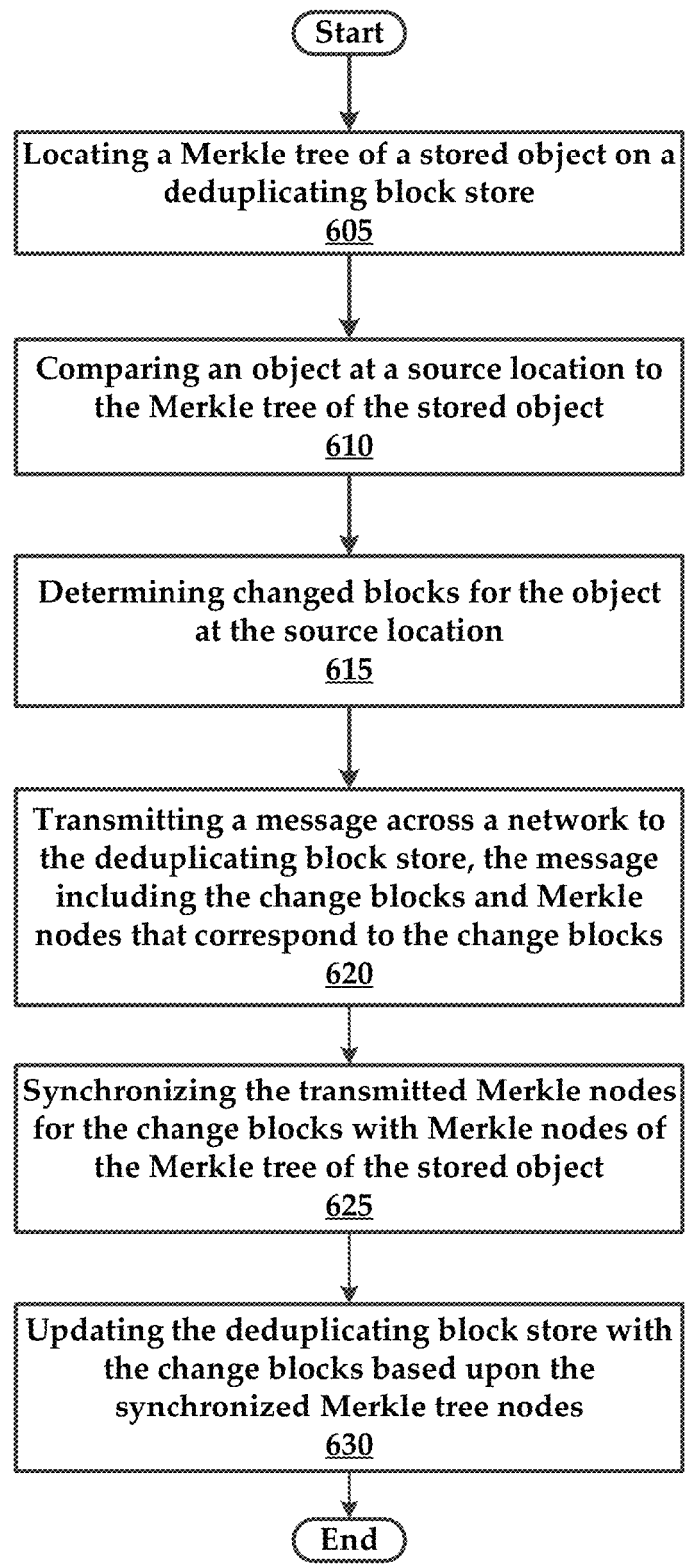
FIG. 6 is a flowchart of an exemplary method for transmitting changed blocks of an object over a network using Merkle trees.

FIG. 6 is a flowchart of an exemplary method for transmitting changed blocks of an object over a network using Merkle trees. More specifically, the method may be generally described as a process for comparing an object at a source location to a Merkle tree representation of a previously stored version of the object on a deduplicating block store. This comparison allows for transmission of only changed blocks across the network for storage in the block store, thus preventing duplicate transmission of blocks that already exist on the data store.

The method may comprise a step 605 of locating a Merkle tree of a previously stored object on a deduplicating block store Merkle. The Merkle tree may comprise a hash table representation of blocks of data for the stored object. The Merkle tree for the object preferably comprises an object identifier that uniquely identifies the stored object within the deduplicating block store.

The method also comprises comparing 610 an object at a source location to the Merkle tree of the stored object. The object at the source location may include changed blocks compared to the stored object. Thus, the method may include a step 615 of determining changed blocks for the object at the source location. The system may correlate the object at the source location with the stored object on the deduplicating block store using the unique identifier assigned to the stored object.

Once changed blocks have been identified, the method may include a step 620 of transmitting a message across a network to the deduplicating block store, the message including the change blocks and Merkle nodes that correspond to the change blocks.

The method may also include 625 synchronizing the transmitted Merkle nodes for the change blocks with Merkle nodes of the Merkle tree of the stored object, as well as a step 630 of updating the deduplicating block store with the change blocks based upon the synchronized Merkle tree nodes.

Figure 7:
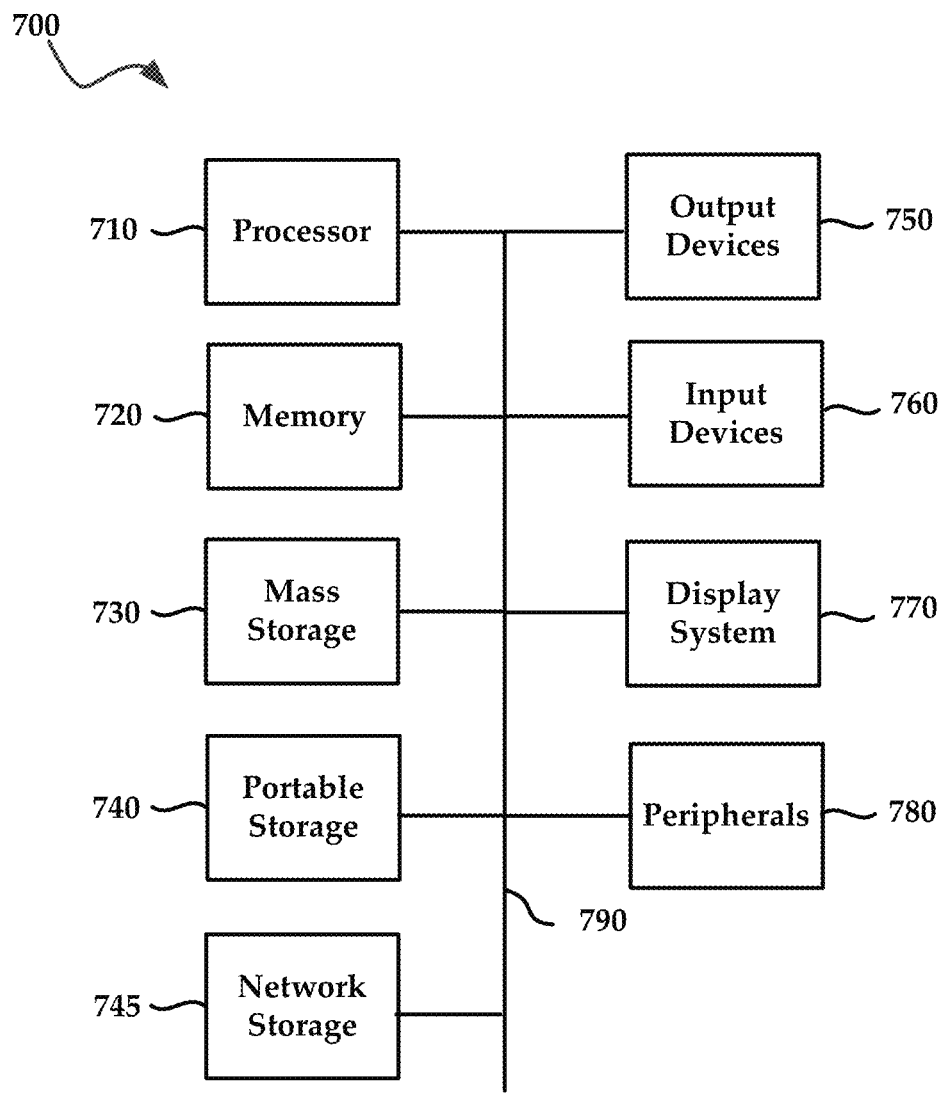
FIG. 7 illustrates an exemplary computing system that may be used to implement embodiments according to the present technology.

FIG. 7 illustrates an exemplary computing system 700 that may be used to implement an embodiment of the present technology. The computing system 700 of FIG. 7 includes one or more processors 710 and main memory 720. Main memory 720 stores, in part, instructions and data for execution by processor 710. Main memory 720 can store the executable code when the computing system 700 is in operation. The computing system 700 of FIG. 7 may further include a mass storage device 730, portable storage drive(s) 740, output device(s) 750, input devices 760, a graphics display 770, and other peripheral device(s) 780. The computing system 700 may also comprise network storage 745.

The components shown in FIG. 7 are depicted as being connected via a single bus 790. The components may be connected through one or more data transport means. Processor 710 and main memory 720 may be connected via a local microprocessor bus, and the mass storage device 730, peripheral device(s) 780, portable storage device 740, and graphics display 770 may be connected via one or more input/output (I/O) buses.

Mass storage device 730, which may be implemented with a magnetic disk drive or an optical disk drive, is a non-volatile storage device for storing data and instructions for use by the processor 710. Mass storage device 730 can store the system software for implementing embodiments of the present technology for purposes of loading that software into main memory 720.

Portable storage device 740 operates in conjunction with a portable non-volatile storage medium, such as a floppy disk, compact disk or digital video disc, to input and output data and code to and from the computing system 700 of FIG. 7. The system software for implementing embodiments of the present technology may be stored on such a portable medium and input to the computing system 700 via the portable storage device 740.

Input devices 760 provide a portion of a user interface. Input devices 760 may include an alphanumeric keypad, such as a keyboard, for inputting alphanumeric and other information, or a pointing device, such as a mouse, a trackball, stylus, or cursor direction keys. Additionally, the computing system 700 as shown in FIG. 7 includes output devices 750. Suitable output devices include speakers, printers, network interfaces, and monitors.

Graphics display 770 may include a liquid crystal display (LCD) or other suitable display device. Graphics display 770 receives textual and graphical information, and processes the information for output to the display device.

Peripheral device(s) 780 may include any type of computer support device to add additional functionality to the computing system. Peripheral device(s) 780 may include a modem or a router.

The components contained in the computing system 700 of FIG. 7 are those typically found in computing systems that may be suitable for use with embodiments of the present technology and are intended to represent a broad category of such computer components that are well known in the art. Thus, the computing system 700 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, comprising:
    locating a Merkle tree of a stored object on a deduplicating block store;
    comparing an object at a source location to the Merkle tree of the stored object;
    determining change blocks for the object at the source location;
    transmitting a message across a network to the deduplicating block store, the message including the change blocks and Merkle nodes that correspond to the change blocks; and
    synchronizing the transmitted Merkle nodes for the change blocks with Merkle nodes of the Merkle tree of the stored object, wherein synchronizing comprises copying the Merkle nodes of the Merkle tree in bottomto-top order to ensure that when a check of any Merkle node is performed that all child Merkle nodes associated with the Merkle node are present, further wherein upon encountering a missing Merkle node during the step of copying, pushing the missing Merkle node onto a stack.

2. The method according to claim 1, further comprising: updating the deduplicating block store with the change blocks based upon the synchronized Merkle tree nodes.

3. The method according to claim 1, further comprising: generating the Merkle tree, the Merkle tree comprising Merkle nodes that represent blocks stored in the deduplicating block store; and
exposing the Merkle tree to a client device through an application programming interface.

4. The method according to claim 1, further comprising evaluating the Merkle tree in top-to-bottom order to determine missing Merkle nodes in the Merkle tree.

5. The method according to claim 1, further comprising: popping the Merkle node from the stack to the deduplicating block store; and
placing a missing data block associated with the missing Merkle node in the deduplicating block store according to the Merkle tree.

6. The method according to claim 1, wherein the stack resides on the deduplicating block store.

7. The method according to claim 1, wherein the stack resides on a client device.

8. The method according to claim 1, further comprising establishing a progress indicator that represents Merkle nodes currently in the stack.

9. The method according to claim 2, further comprising generating a new identifier for each of the change blocks.

10. A system, comprising:
a processor; and
logic encoded in one or more tangible, non-transitory media for execution by the processor and when executed operable to perform operations comprising:
locating a Merkle tree of a stored object on a deduplicating block store;
comparing an object at a source location to the Merkle tree of the stored object;
determining change blocks for the object at a source location;
transmitting a message across a network to the deduplicating block store, the message including the change blocks and Merkle nodes that correspond to the change blocks; and
synchronizing the transmitted Merkle nodes for the change blocks with Merkle nodes of the Merkle tree of the stored object, wherein synchronizing comprises copying the Merkle nodes of the Merkle tree in bottom-to-top order to ensure that when a check of any Merkle node is performed that all child Merkle nodes associated with the Merkle node are present, further wherein upon encountering a missing Merkle node during the step of copying, pushing the missing Merkle node onto a stack.

11. The system according to claim 10, further comprising: updating the deduplicating block store with the change blocks based upon the synchronized Merkle tree nodes.

12. The system according to claim 10, wherein the processor further executes the logic to perform operations of:
generating the Merkle tree, the Merkle tree comprising Merkle nodes that represent blocks stored in the deduplicating block store; and
exposing the Merkle tree to a client device.

13. The system according to claim 10, wherein the processor further executes the logic to perform an operation of evaluating the Merkle tree in top-to-bottom order to determine missing Merkle nodes in the Merkle tree.

14. The system according to claim 10, wherein the processor further executes the logic to perform operations of:
popping the Merkle node from the stack to the deduplicating block store; and
placing a missing data block associated with the missing Merkle node in the deduplicating block store according to the Merkle tree.

15. The system according to claim 10, wherein the stack resides on any of the deduplicating block store and a client device.

16. The system according to claim 10, wherein the processor further executes the logic to perform an operation of establishing a progress indicator that represents Merkle nodes currently in the stack.

17. The system according to claim 11, wherein the processor further executes the logic to perform an operation of generating a new identifier for each of the change blocks of the synchronized Merkle tree nodes.

18. A method, comprising:
generating a first Merkle tree for an object, the first Merkle tree comprising Merkle nodes that represent blocks of the object;
examining an input data stream;
generating a second Merkle tree for the object using the input data stream;
comparing the first Merkle tree and the second Merkle tree to one another to determine changed Merkle nodes that do not correspond between the first Merkle tree and the second Merkle tree;
transmitting data blocks that correspond to the changed Merkle nodes from a source location to a deduplicating block store; and
synchronizing the transmitted Merkle nodes for the change blocks with Merkle nodes of the Merkle tree of the stored object, wherein synchronizing comprises copying the Merkle nodes of the Merkle tree in bottom-to-top order to ensure that when a check of any Merkle node is performed that all child Merkle nodes associated with the Merkle node are present, further wherein upon encountering a missing Merkle node during the step of copying, pushing the missing Merkle node onto a stack.

* * * * *